United States Patent [19]

Bryant

[11] 4,028,033

[45] June 7, 1977

[54] APPARATUS FOR EMBOSSING A PLASTIC WORKPIECE USING VIBRATORY ENERGY

[75] Inventor: Ronald K. Bryant, Brookfield, Conn.

[73] Assignee: Branson Ultrasonics Corporation, New Canaan, Conn.

[22] Filed: Feb. 17, 1976

[21] Appl. No.: 658,231

Related U.S. Application Data

[62] Division of Ser. No. 569,807, April 21, 1975, abandoned.

[52] U.S. Cl. .............................. 425/183; 425/193; 425/385; 425/456; 264/71; 264/284; 264/293
[51] Int. Cl.² .......................................... B29C 3/00
[58] Field of Search .......... 425/385, 456, 182, 194, 425/183; 264/23, 71, 284, 293; 29/125

[56] References Cited
UNITED STATES PATENTS

| | | | |
|---|---|---|---|
| 776,796 | 12/1904 | Perkins | 29/125 X |
| 2,712,205 | 7/1955 | Valette | 29/125 X |
| 3,233,012 | 2/1966 | Bodine, Jr. | 264/23 |
| 3,289,631 | 12/1966 | Vachon et al. | 29/125 X |
| 3,541,216 | 11/1970 | Rochlis | 264/293 |
| 3,635,609 | 1/1972 | Balamuth | 425/385 X |
| 3,911,074 | 10/1975 | Kessler | 264/23 X |

*Primary Examiner*—Robert L. Spicer, Jr.
*Attorney, Agent, or Firm*—Ervin B. Steinberg; Philip J. Feig

[57] ABSTRACT

This invention concerns an apparatus for embossing a plastic workpiece using vibratory energy. A workpiece to be embossed is brought into forced engagement with indicia carried by an embossing ring which is disposed at or in proximity to the antinodal region of longitudinal motion of a resonator. The resonator is caused to vibrate at its natural frequency of oscillation in a direction substantially parallel to the workpiece surface. After embossing the workpiece is removed from contact with the resonator.

10 Claims, 9 Drawing Figures

APPARATUS FOR EMBOSSING A PLASTIC WORKPIECE USING VIBRATORY ENERGY

This is a division of application Ser. No. 569,807, filed Apr. 21, 1975, now abandoned.

SUMMARY OF THE INVENTION

This invention concerns a novel apparatus for embossing a plastic workpiece using vibratory energy and reveals also a novel construction for a half wavelength resonator having ring means for providing selectively adjustable embossing indicia. The present invention is particularly useful for embossing polymeric thermoplastic workpieces or compressible (plastic) workpieces with identifying indicia, such as part identifying or serializing characters.

In U.S. Pat. No. 3,813,006, dated May 28, 1974, entitled "Replaceable Welding Tip for Vibratory Welding Apparatus" by E. P. Holze, Jr. et al, a half wavelength resonator for use in a vibratory metal welding apparatus is described. The patent discloses a resonator fitted with a welding tip having a plurality of workpiece engaging surfaces. In the present invention an embossing ring of similar construction is described wherein each workpiece engaging surface includes an indicium for embossing a plastic workpiece. When a workpiece is to be provided with several indicia, a plurality of embossing rings, each having indicia along its peripheral surface, are disposed at or in proximity to an antinodal region of longitudinal motion of the half wavelength resonator. The plastic workpiece is urged into contact with the indicia and responsive to rendering said resonator resonant at its predetermined frequency, typically a frequency in the range between 1 kHz and 100 kHz, the resonator is caused to vibrate at the predetermined frequency and amplitude. The longitudinal motion of the half wavelength resonator is in a direction substantially parallel to the workpiece surface and the amplitude of the longitudinal motion at the antinodal region during embossing typically is 2.5 mils (63 microns) peak to peak.

Each embossing ring comprises a plurality of circumferentially disposed equidistant workpiece engaging surfaces having an indicium which can be transferred into the workpiece. The equidistant locations ensure that the tip provides a balanced mass near the antinodal region of longitudinal motion of the half wavelength resonator. When embossing a workpiece with a plurality of indicia, it is essential that all the indicia are in alignment. To this end, indexing means are provided for each embossing ring to assure proper alignment of the indicia. The individual rings are each readily adjustable and replaceable for providing maximum versatility of the vibrator embossing apparatus.

A principal object of the present invention is, therefore, the provision of a novel apparatus for embossing a plastic workpiece using vibratory energy.

Another object of this invention is the provision of a half wavelength resonator having embossing rings for use in a vibratory embossing apparatus.

A further object of this invention is the provision of means for indexing the indicia in a vibratory embossing apparatus.

Another object of this invention is the provision of replaceable and interchangeable indicia and embossing rings in a vibratory embossing apparatus.

Further and still other objects of this invention will become more fully apparent when the description is read in conjunction with the accompanying drawings.

DETAILED DESCRIPTION OF THE INVENTION

Figure 1:
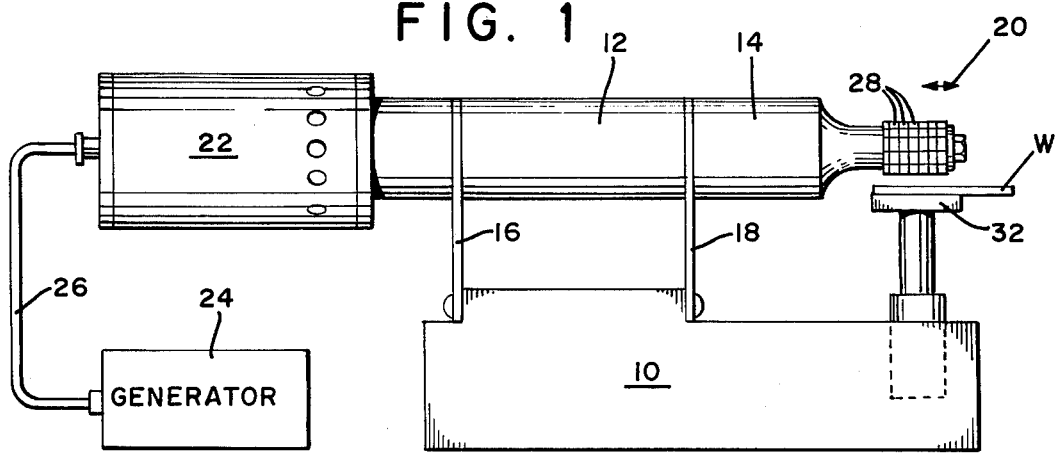
FIG. 1 is a side elevational view of a typical apparatus for embossing a plastic workpiece.

Referring now to the figures and FIG. 1 in particular, there is shown a vibratory embossing apparatus forming the present invention. A stationary support 10 is provided with two upstanding leaf spring members 16 and 18 for supporting a vibratory assembly comprising an electroacoustic converter 22, a coupler 12 and an embossing horn 14, the latter being known also as tool, resonator, concentrator or mechanical motion amplifier. The converter 22 is electrically coupled via a cable 26 to an electrical high frequency generator which, when provided electrical energy of predetermined frequency, causes the converter 22 to transform the applied electrical energy to mechanical vibrations for rendering the vibratory assembly resonant along its longitudinal axis. The assembly is designed to be resonant at a predetermined frequency, typically a frequency in the range from 1 to 100 kHz.

When resonant, the frontal end of the horn 14 is located at an antinodal region of longitudinal motion which motion is in the direction as is indicated by the arrow 20. The antinodal region of the horn is fitted with a plurality of concentric embossing rings 28, each having circumferentially spaced embossing indicia 39 along the outer peripheral surface. A workpiece to be embossed, such as a plastic plate W, is disposed in a hydraulically operated anvil plate 32 and brought into forced contact with the embossing indicia. When the horn 14 is rendered resonant responsive to energizing the generator 24 and converter 22, the indicia are vibrated along the surface of the workpiece with an amplitude in the order of 30 to 90 microns, causing a corresponding relief pattern to be engraved in the workpiece W. Upon completion of the embossing operation, typically after one second, the electrical energy from the generator is shut off and the anvil is retracted away from the embossing horn 14 to provide for the removal of the workpiece.

The vibratory embossing apparatus, except for the detailed construction of the horn 14, is substantially identical with the vibratory welding apparatus disclosed in U.S. Pat. No. 3,752,380 issued to A. Shoh, dated Aug. 14, 1973. The converter 22 typically includes piezoelectric means for converting the electrical energy to mechanical vibrations and a converter suitable for this purpose is shown in U.S. Pat. No. 3,328,610 dated June 27, 1967, issued to S. E. Jacke.

Figure 2:
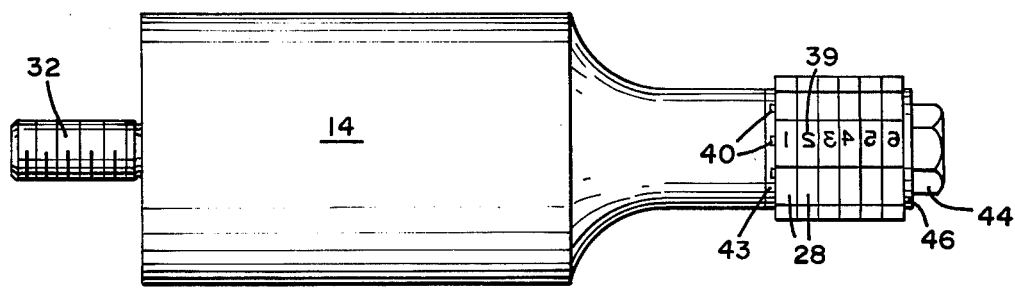
FIG. 2 is an enlarged view of the resonator and the embossing rings per FIG. 1.
Figure 3:
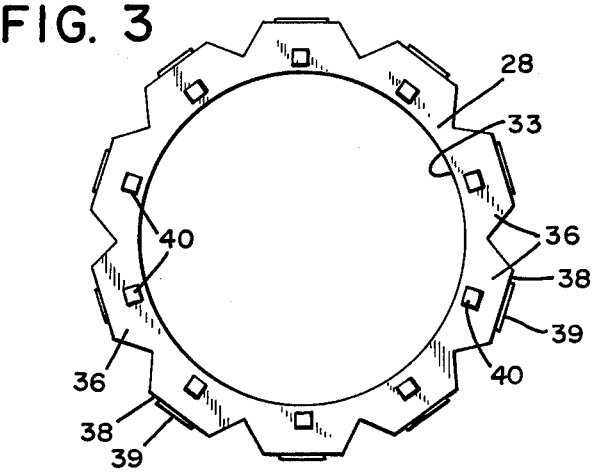
FIG. 3 is a plan view of an embossing ring.

Referring to FIGS. 2, 3, 4 and 5, a detailed view of the construction of the horn 14 with embossing rings 28 is shown. Each embossing ring 28, as best seen in FIG. 3, includes a centrally disposed aperture 33 dimensioned to snugly fit over the shoulder 34 of the horn. A plurality of equidistant circumferentially spaced ridges 36, forming a unitary part of the ring 28, exhibit respective peripherally disposed and radially extending embossing indicia 39 for engaging the workpiece W. Each workpiece engaging surface of the ring 28 includes an indicium for contacting a workpiece and leaving a permanent impression therein. The indicium 39 on a particular ridge may comprise an alpha-numeric character or a design symbol, etc. The embossing ring 28 is made of a hard metal, exhibiting low heat loss while undergoing vibratory motion in the sonic or ultrasonic frequency range. Exemplary of such a metal is titanium, although steel may also be used.

Figure 4:
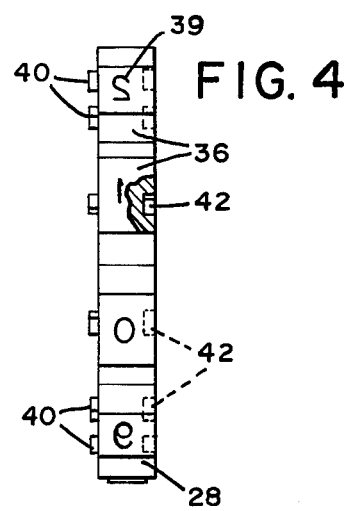
FIG. 4 is an elevational view of the emobossing ring.
Figure 5:
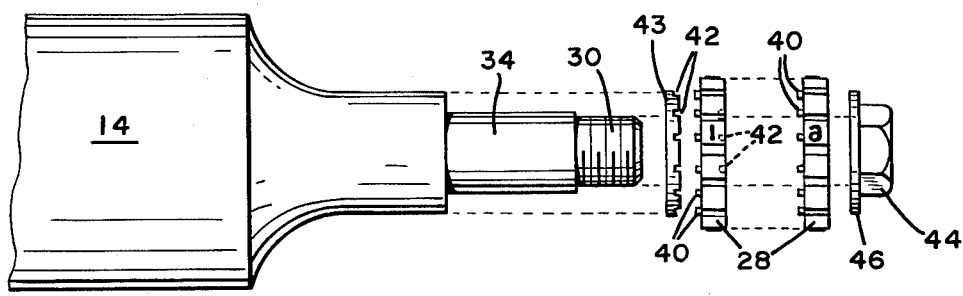
FIG. 5 is an exploded view disclosing embossing rings and their attachment to the resonator.

As is apparent from FIG. 2, several embossing rings 28 can be juxtaposed for embossing a workpiece with a sequence of characters and in this case the selected indicia on each ring 28 must be in alignment or register. As seen in FIG. 4, indexing tabs 40 and notches 42 provided at equidistant location along the circumference of the ring 28 provide the desired alignment. Each ring 28 is rotated so that the desired combination of indicia will be in register for contacting the workpiece. The tab 40 of a particular ring is designed to become disposed in a notch 42 of an adjacent ring for assuring alignment of the indicia. A washer 43 containing notches 42 is fitted over the shoulder 34 for aligning the left most ring 28. When all the rings 28 are properly indexed and disposed on the shoulder 34, a nut 44 having a flanged surface 46 is tightened upon the threaded stud 30 of the horn 14 for maintaining the embossing rings in alignment.

For embossing a workpiece is placed upon the anvil 32. The hydraulic or pneumatic piston 32 is operated for urging the workpiece into forced contact with the workpiece engaging indicia 39. Responsive to an electrical signal from the generator 24 the resonator 14 is caused to undergo vibratory motion along an axis parallel to the workpiece surface and typically the embossing end of the resonator 14, which is the antinodal region of longitudinal motion, will be subjected to a peak to peak displacement of approximately 2.5 mils (63 microns). After a predetermined length of time, typically 1 second, the anvil 32 is retracted and the now embossed workpiece W is removed.

Figure 6:
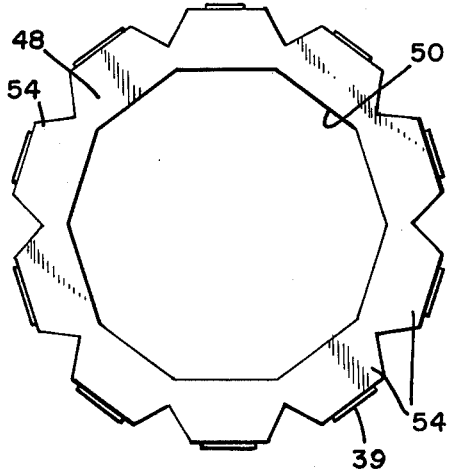
FIG. 6 is a plan view of an alternative embodiment of the embossing ring.
Figure 7:
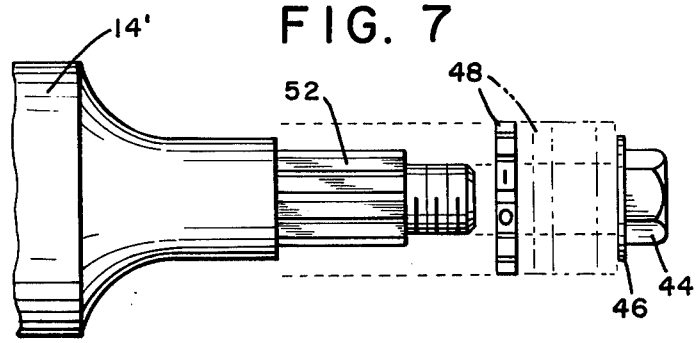
FIG. 7 is an exploded view disclosing the embossing rings per FIG. 6 and their attachment to the resonator.

In an alternative construction, the embossing ring 48, as best seen in FIGS. 6 and 7, includes a centrally disposed decagonal aperture 50 dimesioned to snugly fit over the decagonally contoured shoulder 52 of the resonator. A plurality of equidistant circumferentially spaced ridges 54, forming a unitary part of the ring 48, exhibit respective peripherally disposed and radially extending embossing indicia 39 for engaging the workpiece W. Each workpiece engaging surface of the ring 48 includes an indicium for contacting a workpiece and leaving a permanent impression therein.

The desired combination of indicia are indexed for maintaining proper alignment or register by snugly fitting the rings 48 over the decagonal surface of the shoulder 52 so that the desired indicium is disposed for contacting the workpiece. When all the rings 28 are properly indexed and disposed on the shoulder 52, a nut 44 having a flanged surface 46 is tightened upon the threaded stud 30 of the horn 14' for maintaining the embossing rings in alignment. The method of embossing a workpiece is as described hereinabove.

Figure 8:
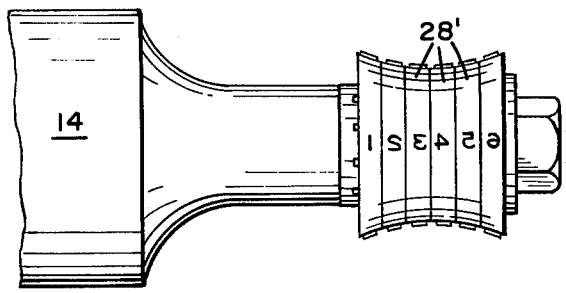
FIG. 8 is a view of an alternative embodiment of the resonator and embossing rings per FIG. 1.
Figure 9:
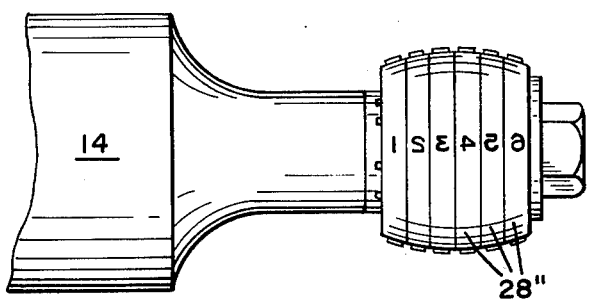
FIG. 9 is a view of another embodiment of the resonator and embossing rings per FIG. 1.

When the workpiece W exhibits a concave or convex surface which is to be embossed, a resonator 14 having contoured embossing rings 28' or 28" as shown in FIGS. 8 and 9 is employed for contacting the respective workpiece surface.

While a preferred embodiment for embossing a plastic workpiece has been described and illustrated, it will be apparent to those skilled in the art that further variations and modifications may be made without departing from the broad principle and spirit of the invention which shall be limited only by the scope of the appended claims.

I claim:

1. An embossing horn for use in a vibratory embossing apparatus comprising:
    an elongated resonator dimensioned to be resonant along it longitudinal axis at a predetermined frequency of vibration;
    a removable embossing ring having a plurality of circumferentially disposed ridges, said ridges forming a unitary part of said ring and being provided with peripherally disposed and radially extending embossing indicia, and
    means for clamping said ring concentrically upon said resonator at or in proximity to an antinodal region of longitudinal motion of said resonator.

2. An embossing horn as set forth in claim 1, said plurality of ridges being equidistantly spaced about the periphery of said ring.

3. An embossing horn as set forth in claim 1, said means for clamping comprising screw means which include an internally threaded nut mating with a threaded stud extending from said resonator.

4. An embossing horn as set forth in claim 1, said resonator being dimensioned to be resonant at a frequency in the range between 1 and 100 kHz.

5. An embossing horn as set forth in claim 1, and including a plurality of juxtaposed embossing rings, and each ring including indexing means for bringing and holding the indicia of said rings in register.

6. An embossing horn as set forth in claim 1, and including a plurality of juxtaposed embossing rings, and each ring being dimensioned for having a diameter for conforming to the contour of a workpiece.

7. A vibratory embossing apparatus comprising:
    an elongated resonator dimensioned to be resonant along its longitudinal axis at a predetermined frequency of vibration;
    an electroacoustic converter coupled to said resonator for rendering said resonator resonant;
    a removable embossing ring having a plurality of circumferentially disposed ridges, said ridges forming a unitary part of said ring and being provided with peripherally disposed and radially extending embossing indicia;
    means for clamping said ring concentrically upon said resonator at or in proximity to an antinodal region of longitudinal motion of said resonator;
    anvil means disposed opposite said embossing ring for supporting a workpiece, and
    means for urging a workpiece disposed on said anvil means into forced contact with an embossing indicium of said ring to cause said embossing indicium, responsive to said resonator being rendered resonant, to undergo vibratory motion along an axis parallel to the workpiece surface portion contacted by said indicium while in contact with said workpiece.

8. A vibratory embossing apparatus as set forth in claim 7, said resonator being dimensioned to be resonant at a frequency in the range between 1 and 100 kHz.

9. A vibratory embossing apparatus as set forth in claim 7, and including a plurality of juxtaposed embossing rings and each ring including indexing means for bringing and holding the indicia of said rings in register.

10. A vibratory embossing apparatus as set forth in claim 7, and including a plurality of juxtaposed embossing rings, and each ring being dimensioned for having a diameter for conforming to the contour of a workpiece.

* * * * *